(12) United States Patent
Hwang et al.

(10) Patent No.: US 6,547,733 B2
(45) Date of Patent: Apr. 15, 2003

(54) ULTRASOUND IMAGING APPARATUS AND METHOD USING GOLAY CODES WITH ORTHOGONAL PROPERTY

(75) Inventors: Jae Sub Hwang, Seoul (KR); Tai Kyong Song, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 0 days.

(21) Appl. No.: 10/017,704

(22) Filed: Dec. 12, 2001

(65) Prior Publication Data

US 2002/0183618 A1 Dec. 5, 2002

(30) Foreign Application Priority Data

May 16, 2001 (KR) ............................... 01-26650

(51) Int. Cl.[7] ................................................ A61B 8/00
(52) U.S. Cl. .................. 600/437; 600/455; 600/437; 600/443; 600/447; 600/448; 600/449; 600/444; 73/625; 73/626; 367/2; 367/1
(58) Field of Search .................. 600/455, 437, 600/443, 447, 448, 449, 444; 73/625, 626; 367/2, 1

(56) References Cited

U.S. PATENT DOCUMENTS

| | | | | | |
|---|---|---|---|---|---|
| 5,961,463 A | * | 10/1999 | Rhyne et al. | ................ | 600/458 |
| 6,213,946 B1 | * | 4/2001 | Brock-Fisher | .............. | 600/443 |
| 6,213,947 B1 | * | 4/2001 | Phillips | ...................... | 600/443 |
| 6,312,384 B1 | * | 11/2001 | Chiao | .......................... | 600/443 |
| 6,350,240 B1 | * | 2/2002 | Song et al. | ................. | 600/443 |

* cited by examiner

*Primary Examiner*—Francis J. Jaworski
*Assistant Examiner*—Maulin Patel
(74) *Attorney, Agent, or Firm*—Wiggin & Dana LLP; Dale L. Carlson; Michael K. Kinney

(57) ABSTRACT

Ultrasound images are obtained using a set of Golay codes with orthogonal property as ultrasound receiving and transmitting signals. Ultrasound signals having a plurality of codes are transmitted simultaneously by using the orthogonal property of the Golay codes. A superior signal-to-noise rate (SNR) is realized using the Golay codes, without suffering a decrease in the frame rate.

18 Claims, 8 Drawing Sheets

ULTRASOUND IMAGING APPARATUS AND METHOD USING GOLAY CODES WITH ORTHOGONAL PROPERTY

FIELD OF THE INVENTION

The present invention relates to an ultrasound imaging apparatus and a method thereof and, more particularly, to an ultrasound imaging apparatus and a method of the same for forming ultrasound images using a set of Golay codes having orthogonal property.

BACKGROUND OF THE INVENTION

An ultrasound imaging apparatus transmits ultrasound signals to an object to be examined and processes signals reflected from the object to provide plane images of the object. It has been widely used in medical apparatuses.

As the power of the ultrasound used in ultrasound imaging apparatuses becomes strong, power of received ultrasound which is scattered or reflected from a medium becomes strong too thereby obtaining excellent signal-to-noise ratio (SNR). Accordingly, if possible, it is advantageous to use ultrasound having great amplitude, i.e., a transmitting wave of high voltage. Consequently, it is desirable to transmit ultrasound having great amplitude and short pulse length.

There is, however, certain limitation of using ultrasound of strong signal power in the application at human body since the ultrasound may influence on the body and also there are some limitations in the system's hardware configuration. In order to resolve those limitations, it is suggested to use ultrasound signals of various code types. Ultrasound of longer length can be transmitted when the ultrasound signal of code type is used. Since the ultrasound of code type is used, the ultrasound of longer length is transmitted. Therefore, the power of instantaneous ultrasound is appropriately adjustable and also more energy is sent, thereby obtaining excellent SNR. Furthermore, received signals are compressed in their lengths by an appropriate signal process thereby obtaining enhanced resolution in the axial direction.

There are some kinds of codes roughly divided into a bi-phase code having 1 and −1, and an arbitrary sequence code having arbitrary values. One can easily construct hardware of an ultrasound transmitter when he/she uses the bi-phase sequence code. Among those bi-phase sequence codes, the Golay code is known for realizing theologically ideal compression.

The Golay code has a set of complementary bi-phase sequences. Here, a predetermined bi-phase sequence set $A_i$ having M number of sequences with length of L can be represented as follows:

$$A_i = [a_{i1}, a_{i2}, \ldots, a_{iL}] \quad \text{Eq. (1)}$$

wherein $i=1,2,\ldots,M$, L is the length of the total sequences, and $a_{i1}, a_{i2}, \ldots, a_{iL}$ represent the biphase biphase sequences.

When the above sequence set satisfies the following equation Eq. (2), it is the complementary bi-phase sequence and the complementary bi-phase sequence set can be also used as the Golay code.

$$\sum_{i=1}^{M} \sum_{l=1}^{L-k} a_{il} a_{i,l+k}^* = ML\delta(k) \quad \text{Eq. (2)}$$

wherein $k=0,1,\ldots,L-1$, and $\delta(k)$ represents a general dirac function in which $\delta(k)$ is 1 in case of $k=0$ or $\delta(k)$ is 0 in case of $k \neq 0$. Herein below, it will be explained about an ultrasound imaging apparatus using a general Golay code.

FIG. 1 is a block diagram of a conventional ultrasound imaging apparatus using Golay codes. As shown in the drawing, the conventional ultrasound imaging apparatus includes: an ultrasound transmitter 100; an transducer array 110; a transmitting/receiving switch 120; an analogue receiver 130; an A/D converter 140; a receiving beamformer 150; a pulse compressor 155; an echo processor 160; and a scan converter 170.

The ultrasound transmitter 100 applies voltage pulse into the transducer array 110 thereby outputting ultrasound signals from each transducer of the transducer array 110. In particular, each transducer generates ultrasound signals in reaction to the pulses applied from a pulser. While transmitting ultrasound signals, a timing point for generating ultrasound signals can be adjusted at each transducer of the transducer array so that the signals can be transmit-focused at a predetermined point in a region of interest. That is, the pulses are applied from the pulser with time delay into each transducer in order to make the signals to reach the predetermined point simultaneously thereby transmit-focusing at a desired position in the region of interest. As a method for deciding the pattern of transmission delay at each transducer, it has been used a fixed focusing technique which enables to bring a pulse energy of the ultrasound pulse into a predetermined point in a target object. In addition to the above, there has been recently proposed a synthetic aperture method as a suggestion to solve those limitations in resolution, which may be caused by using the fixed focusing technique.

The transmitting/receiving switch 120 acts for protecting the analogue receiver 130 from high voltage emitted from the ultrasound transmitter 100. In other words, the transmitting/receiving switch 120 switches properly the ultrasound transmitter 100 and the analogue receiver 130 while the transducer performs receiving and transmitting in turns.

The transducer array 110 has a plurality of transducers, for example 128 transducers, and each transducer reacts to a voltage applied from the ultrasound transmitter 100 and outputs ultrasound pulses. The fixed focusing technique or the synthetic aperture method as aforementioned can be used for such transmitting method. Herein, only some of the plurality of transducers are used for transmission of a time. In the fixed focusing technique, although an imaging apparatus includes 128 transducers, for example, only 64 transducers of them within a selected aperture transmit at one transmission of the ultrasound signals to a target object thereby forming one scan line.

The analogue receiver 130 receives reflected signals of ultrasound pulses returning from the object, in which the ultrasound pulses are outputted from each transducer of the transducer array 110; and also transmits processed signals into the A/D converter 140, in which the received reflected signals are amplified, removed the aliasing phenomenon and noise components, and attenuates equalization caused while the ultrasound passes through internal body. The A/D converter 140 converts an analogue signal from the analogue receiver 130 to a digital signal, and provides the digital signal to the receiving beamformer 150. The receiving beamformer 150 performs a dynamic receive-focusing by applying various amounts of delay, which vary with locations of the receive-focusing, to signals received from the A/D converter 140 and synthesizes the delayed signals.

The pulse compressor 155 processes the signals received from the receiving beamformer 150 in order to obtain resolution having similar quality as that of an ultrasound imaging apparatus of short pulse type. In the ultrasound imaging apparatus using long code like the Golay code, pulse compression is necessary because side-lobes of the received signals at the receiving beamformer 150 are too large to consist an image.

The echo processor 160 changes the pulse-compressed signals of the pulse compressor 155 into baseband signals, and extracts an envelope by using a quadrature demodulator, thereby obtaining data of a scan line.

The scan converter 170 stores the data obtained from the echo processor 160 in a memory (not shown), and matches a scan direction of the stored data to a pixel direction of a monitor. Meanwhile the data is mapped out at its corresponding pixel position on a monitor.

FIG. 2 illustrates an ultrasound transmitting process in the conventional ultrasound imaging apparatus as shown in FIG. 1. For convenience of explanation, the drawing only exemplifies a Golay code including a code sequence set of $A_1$, $A_2$ having length of L and M=2, and transmission by focusing at one focal point P.

In a first ultrasound transmission at one pulse repetition interval (PRI), all array elements $1a$~$1h$ within a predetermined aperture of the transducer array 110 transmit ultrasound with increased amount of delay to an object so that the first code sequence $A_1$ has the focal point P, and receive signals reflected from the object.

In a second ultrasound transmission at next PRI, all array elements $1a$~$1h$ within the predetermined aperture of the transducer array 110 transmit ultrasound with increased amount of delay to an object so that the second code sequence $A_2$ has the focal point P, and receive signals reflected from the object.

An image of the scan line can be displayed by using the signals received from those two transmissions. In particular, the signals received from the respective array elements laugh are pulse-compressed, and then selected amount of delay is loaded thereto, or alternatively the pulse-compression of the signals can be performed after obtaining the result of loading the selected amount of delay.

When the ultrasound is transmit-focused to a focal point with the use of a conventional bi-phase Golay code as described so far, the transmission must be performed as many times as the number of sequences included in one Golay code, i.e., M number of transmissions. Consequently, frame rate is reduced by 1/M compared with a general pulsing technique.

SUMMARY OF THE INVENTION

Therefore, an object of the present invention is to provide an ultrasound imaging apparatus and method that can provide excellent SNR and resolution in axial directions, which are advantages of the Golay code sets, by using the Golay code sets having orthogonal property, and also prevent reduction in the frame rate.

In accordance with one aspect of the present invention, there is provided an ultrasound imaging apparatus for forming an ultrasound image of an object, comprising: storing means for storing M number of orthogonal code sets having M number of complementary code sequences; transmitting means for sequentially transmitting M number of combined signals serving as an ultrasound transmission signals to M number of focal points within the object, in which M number of combined signals being obtained by combining the respective corresponding code sequences within the M number of code sets; receiving means for receiving signals reflected from the corresponding focal points to which the ultrasound signals are transmitted; and processing means for extracting data corresponding to the M number of code sequences within the stored M number of code sets from the reflected signals in order to form the ultrasound image of the object.

In accordance with another aspect of the present invention, there is provided an ultrasound imaging method for an object comprising the steps of: preparing M number of orthogonal code sets having M number of complementary code sequences; sequentially transmitting M number of combined signals serving as ultrasound transmission signals to M number of focal points within the object, in which the M number of combined signals are obtained by combining the respective corresponding code sequences within the M number of code sets; receiving signals reflected from the corresponding focal points to which the ultrasound signals are transmitted; and processing to form the ultrasound image of the object by extracting data for the M number of code sequences within the stored M number of code sets from the reflected signals.

BRIEF DESCRIPTION OF DRAWINGS

The aforementioned aspects and other features of the present invention will be explained in the following description, taken in conjunction with the accompanying drawings wherein.

DETAILED DESCRIPTION OF THE PRESENT INVENTION

Figure 1:
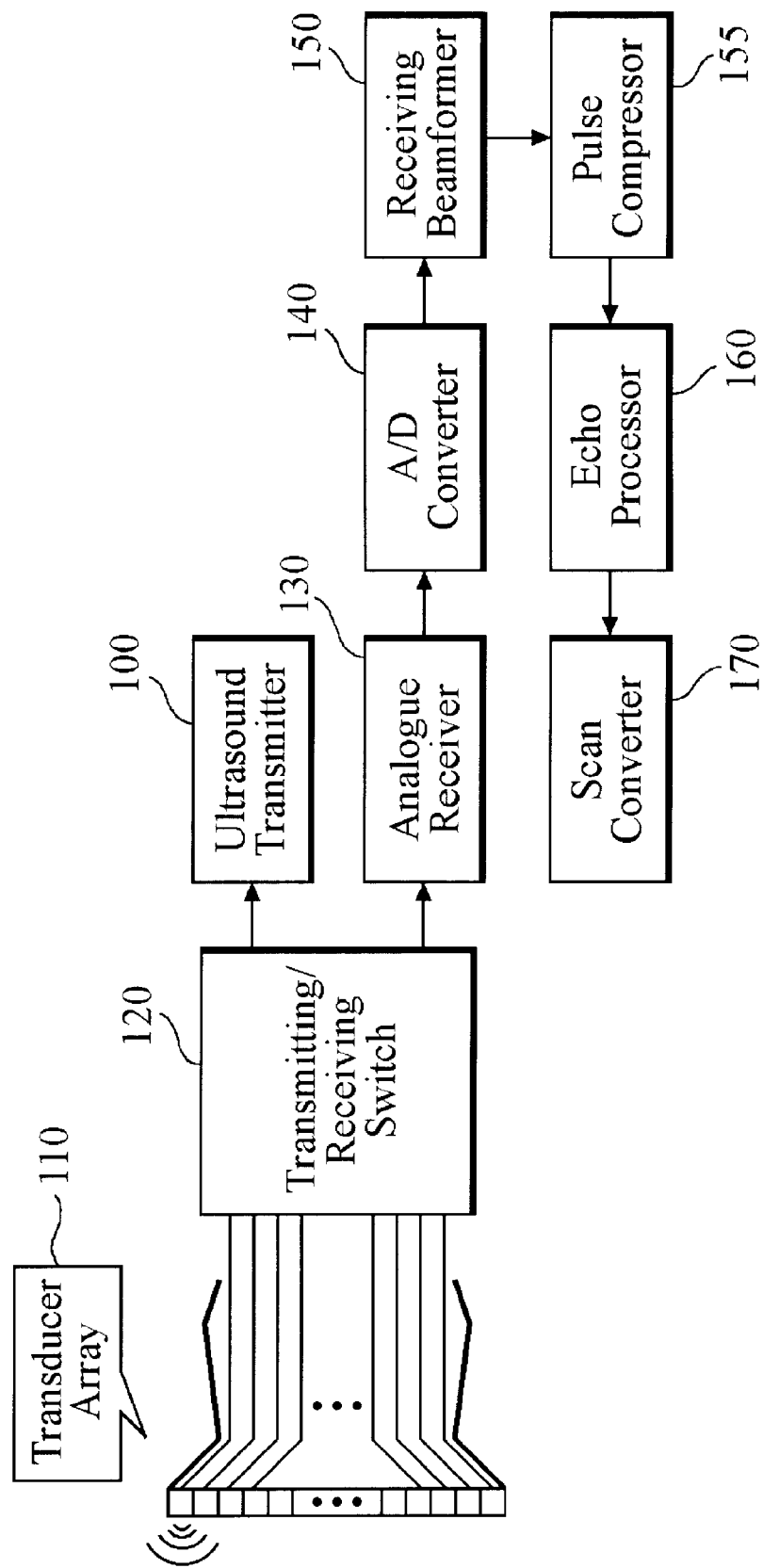
FIG. 1 is a block diagram of a conventional ultrasound imaging apparatus for forming an ultrasound image using Golay codes.
Figure 2:
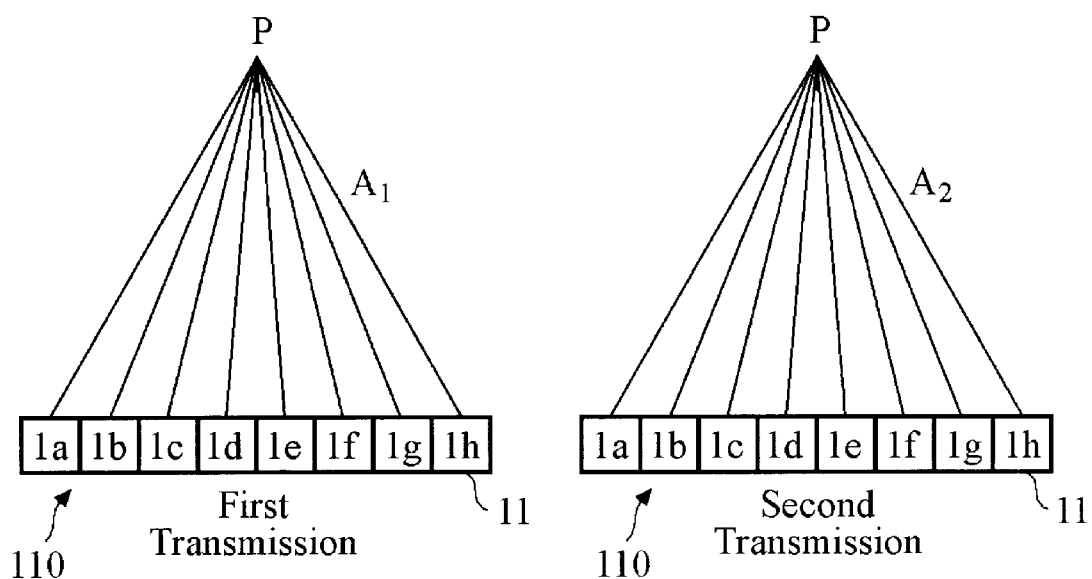
FIG. 2 illustrates an ultrasound transmitting process in the conventional ultrasound imaging apparatus as shown in FIG. 1.

Preferred embodiments of the present invention will now be made with references to the accompanied drawings. Through the entire drawings, like parts as those in FIGS. 1 and 2 are given with same reference numerals, and detailed descriptions thereof will be omitted.

First, the orthogonality of Golay codes to be used in this invention will be discussed.

As defined in Eq. (2) in the above, for complementary code sequences ($A_1$, $A_2$), there exist complementary code sequences ($B_1$, $B_2$) that are orthogonal to code sequences ($A_1$, $A_2$). There are M code sequence sets satisfying the following equation Eq. (3):

$$\sum_{i=1}^{M} \sum_{l=1}^{L-k} a_{il} b_{i,l+k}^* = 0 \qquad \text{Eq. (3)}$$

wherein $K=0,1,\ldots,L-1$.

The present invention uses these mutually orthogonal sets of complementary Golay codes in producing ultrasound images.

Embodiment 1

Figure 3:
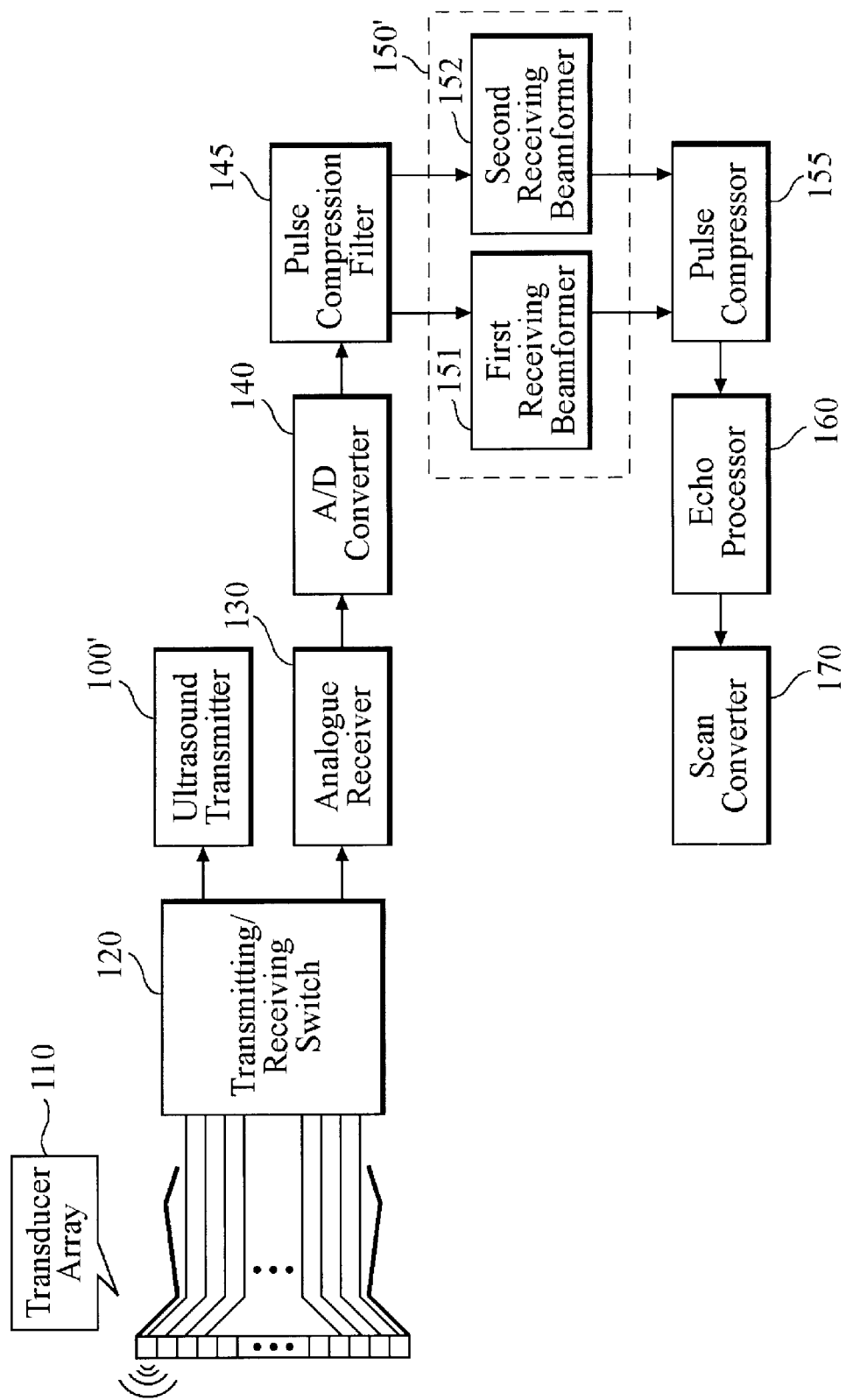
FIG. 3 is a block diagram of an ultrasound imaging apparatus according to a first embodiment of the present invention.

FIG. 3 is a block diagram of an ultrasound imaging apparatus according to a first embodiment of the present invention. Descriptions of elements that were already explained referring to FIG. 1 will be omitted. An ultrasound transmitter 100', a pulse compression filter 145 and a receiving beamformer 150' according to the present invention will be described in detail.

The ultrasound transmitter 100' transmits ultrasound to an object by using a first set of code sequences $A_1$, $A_2$ and a second set of code sequences $B_1$, $B_2$. The first code sequence set $A_1$, $A_2$ forms an N-th scan line and the second code sequence set forms an (N+1)-th scan line.

Figure 4:
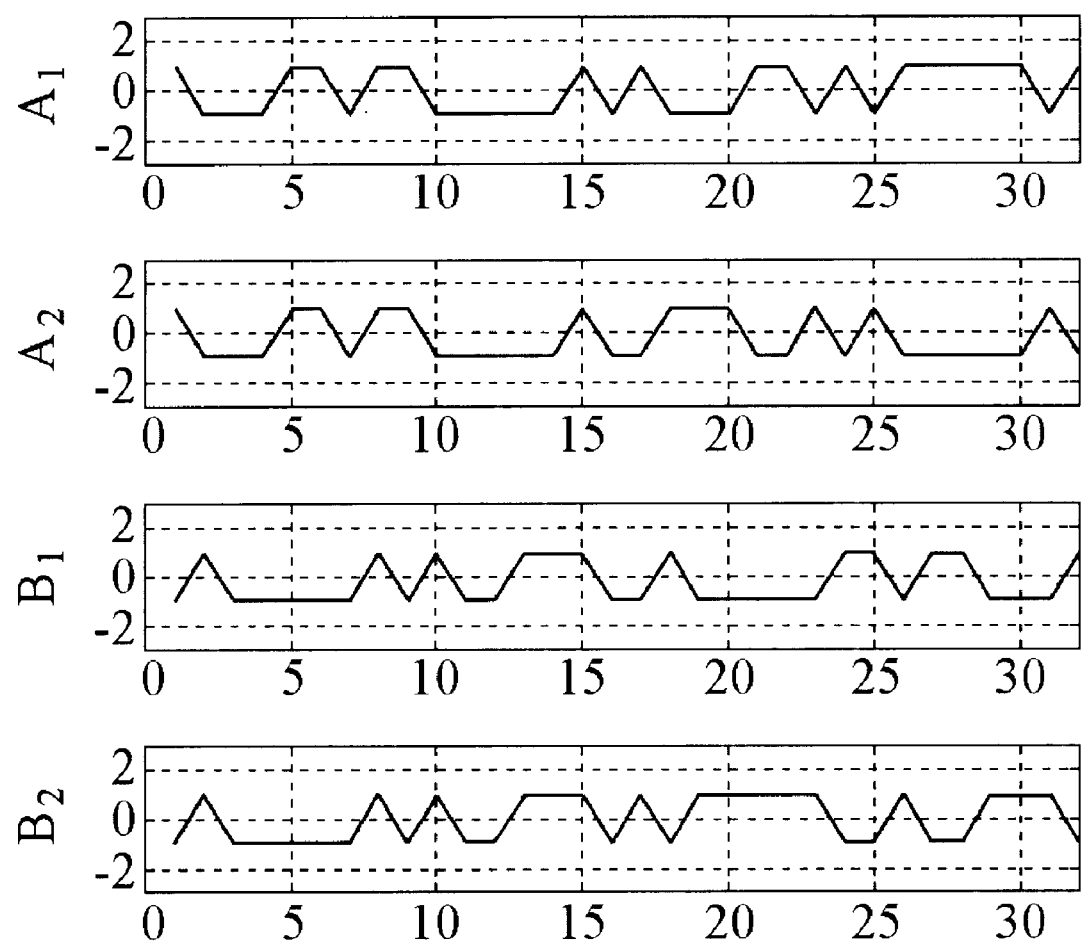
FIG. 4 explains exemplary waveforms of code patterns of a first code sequence set $A_1$, $A_2$ and a second code sequence set $B_1$, $B_2$ in case of M=2 and L=32.

FIG. 4 explains the waveforms of exemplary code patterns of the first code sequence set $A_1$, $A_2$ and the second code sequence set $B_1$, $B_2$ in the case that M=2 and L=32.

Figure 5:
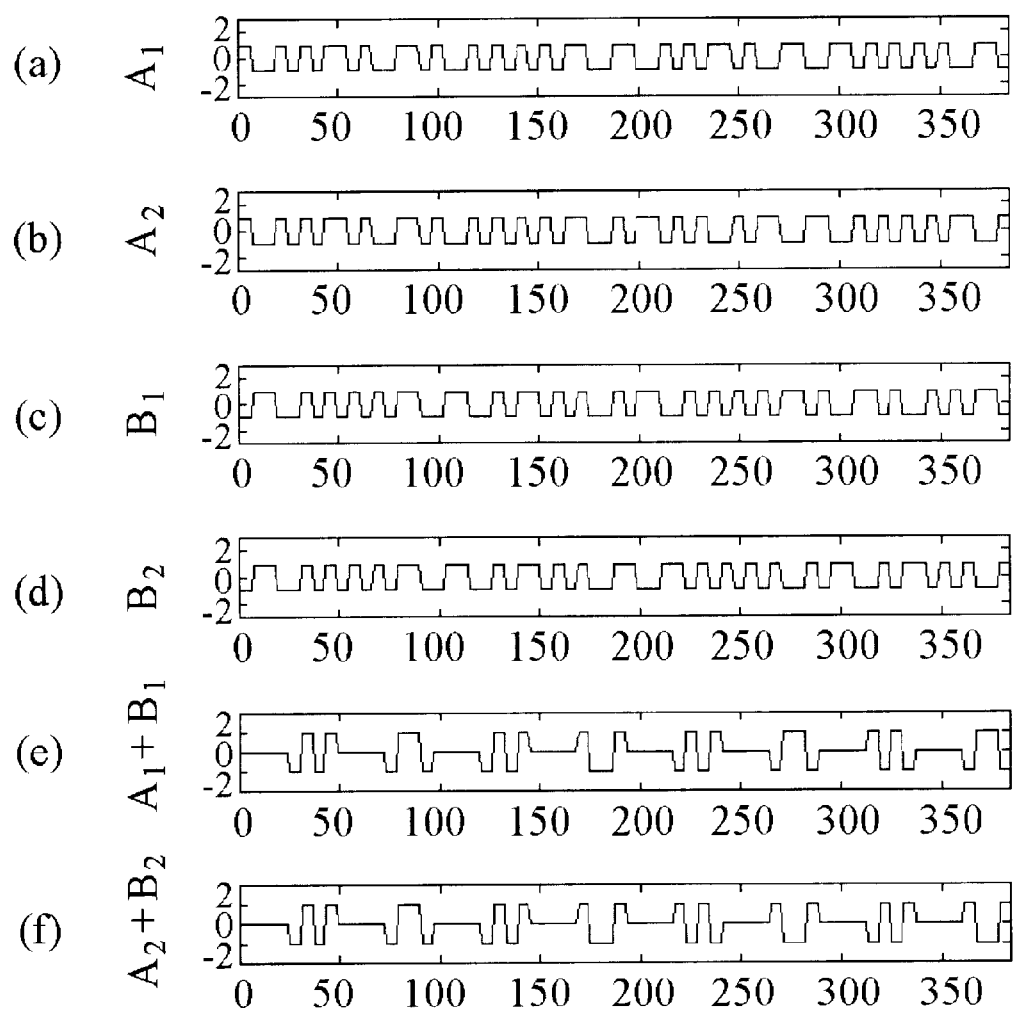
FIG. 5 illustrates exemplary waveforms of a code pattern modified as a center frequency of a transducer.

If these codes are directly applied to transducers, the transmission efficiency will be low. Therefore, it is more advantageous to use codes that are modified as the center frequency of the transducers. Waveforms (a) to (d) of FIG. 5 illustrate exemplary code patterns modified as the center frequency of the transducers.

At a first instance of ultrasound transmission, the ultrasound transmitter 100' provides all transducers 1a~1h within a selected aperture of the transducer array 110 with pulse signals $X(A_1+B_1)$, which represents the sum of a first code sequence $A_1$ and a corresponding first orthogonal code sequence $B_1$. At a second instance of ultrasound transmission, the ultrasound transmitter 100' provides pulse signals $Y(A_2+B_2)$, which represents the sum of a second code sequence $A_2$ and a corresponding second orthogonal code sequence $B_2$. In other words, unlike the conventional Golay code technique, the ultrasound transmitter 100' according to the present invention transmits an ultrasonic signals having multi-levels. Particularly, the conventional ultrasound transmitter 100 is applied with by a high voltage pulse of two levels {+1, −1}, whereas the ultrasound transmitter 100' of the present invention is driven with a high voltage pulse of more than two levels, i.e., {+2, +1, 0, −1, −2}, representing the sum of two code sequences $A_1$ and $B_1$, or $A_2$ and $B_2$, which are orthogonal to each other and have different amounts of delay. For M=1, there will be 2M+1 levels. FIGS. 5(e)–5(f) illustrate exemplary high voltage pulses modified as the center frequency of the transducer.

The pulse compression filter 145 is connected between the A/D converter 140 and the receiving beamformer 150. It filters data from received pulse signals $X'(A_1+B_1)$ and $Y'(A_2+B_2)$ that are reflected from an object with respect to transmitted pulse signals $X(A_1+B_1)$ and $Y(A_2+B_2)$ respectively. The filtered data are used to form the N-th scan line and (N+1)-th scan line. In other words, since signals transmitted from a selected transducer contain data corresponding to the N-th scan line, i.e., $A_1$, $A_2$ as well as data corresponding to the (N+1)-th scan line, i.e., $B_1$, $B_2$, the pulse compression filter 145 discriminates between data corresponding to different scan lines before providing them to the beamformer 150'.

Figure 6:
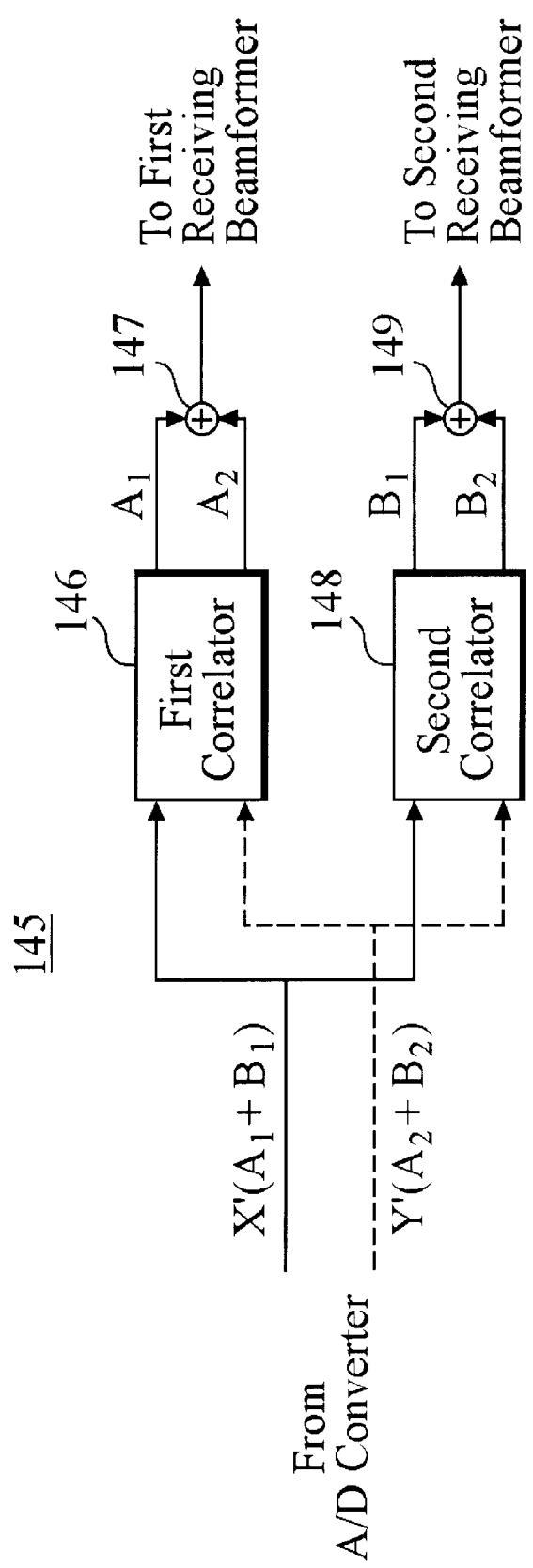
FIG. 6 is a block diagram of a pulse compression filter as shown in FIG. 3.

FIG. 6 is a detailed block diagram of the pulse compression filter 145 shown in FIG. 3. The pulse compression filter 145 includes M correlators that are physically connected to each other in parallel. For an embodiment where M=2, two correlators 146 and 148 are illustrated. Adders 147 and 149 are connected to the outputs of the correlators 146 and 148 respectively. The first correlator 146 extracts $A_1$ from the received pulse signal $X'(A_1+B_1)$ and $A_2$ from the received pulse signal $Y'(A_2+B_2)$ before providing them to the first adder 147. The first adder 147 adds together $A_1$ with $A_2$ and provides the sum as RF data corresponding to the N-th scan line to the first beamformer 150'. In the same manner, the second correlator 148 extracts B, from the received pulse signal $X'(A_1+B_1)$ and $B_2$ from the received pulse signal $Y'(A_2+B_2)$, and provides them to the second adder 149. The second adder 149 adds together $B_1$ and $B_2$ before providing the sum as RF data corresponding to the (N+1)-th scan line to the second beamformer 152.

The beamformer 150' performs dynamic receive-focusing by using the RF data from the pulse compression filter 145. In order to process the RF data corresponding to the N-th scan line and the (N+1)-th scan line simultaneously, the beamformer 150' actually includes two beamformers, i.e., the first beamformer 151 and the second beamformer 152. The first beamformer 151 receives RF data input for the N-th scan line from the adder 147 to perform receive-focusing with respect to the focal point P. Similarly, the second beamformer 152 receives RF data input for the (N+1)-th scan line from the adder 149 to perform dynamic receive-focusing with respect to the focal point Q. If a dual-beam receiving function is desired, four beamformers may be used.

Figure 7:
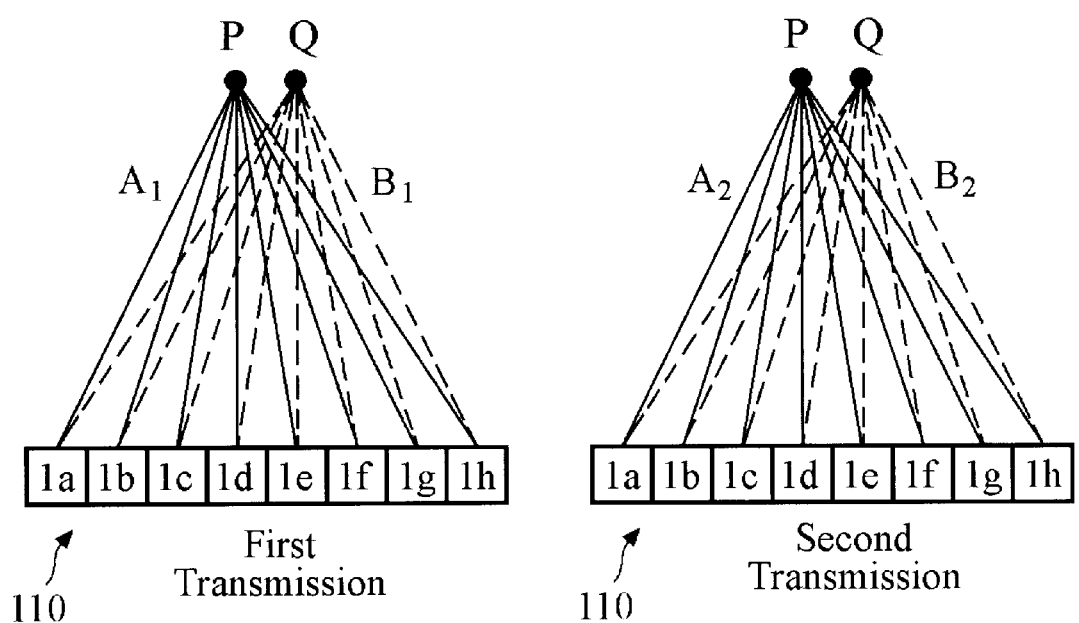
FIG. 7 is a drawing for explaining an ultrasound transmitting process in accordance with the first embodiment of the present invention.

Next, referring to FIG. 7, an ultrasound transmitting process in accordance with the first embodiment will be described.

At the first instance of transmission, all transducers 1a~1h within a selected aperture of a transducer array 110 transmits to an object a signal $X(A_1+B_1)$, which represents the sum of two sequence codes $A_1$ and $B_1$ having different amounts of delay and being orthogonal to each other such that a first code sequence $A_1$ with transmit-focus delays is transmit-focused at the point P, which is a transmit-focusing position on the N-th scan line and, simultaneously, a first orthogonal code sequence $B_1$ with transmit-focus delays is transmit-focused at the point Q, which is a transmit-focusing position on the (N+1)-th scan line.

At the second instance of transmission, the same transducers 1az~1h used at the first instance of transmission transmit to an object a signal $Y(A_2+B_2)$, which represents the sum of two sequence codes $A_2$ and $B_2$ having different amounts of delay and being orthogonal to each other such that a second code sequence $A_2$ with transmit-focus delay is transmit-focused at the point P which is a transmit-focusing position on the N-th scan line and, simultaneously, a second orthogonal code sequence $B_2$ with transmit-focus delay is transmit-focused at the point Q, which is a transmit-focusing position on the (N+1)-th scan line.

At reception, data required to form N-th and (N+1)-th scan lines are obtained by extracting $A_1$, $A_2$ and $B_1$, $B_2$ from $X'(A_1+B_1)$ and $Y'(A_2+B_2)$ which are reflected signals of $X(A_1+B_1)$ and $Y(A_2+B_2)$.

According to this first embodiment, since a Golay code set $X(A_1+B_1)$ or $Y(A_2+B_2)$ having two code sequences $A_1$ and $B_1$, or $A_2$ and $B_2$, which are orthogonal to each other, is transmitted with one instance of transmission, an ultrasound image data with respect to two scan lines can be obtained by two transmissions. Accordingly, the frame rate in this invention is not lowered than that of the conventional pulsing technique.

Furthermore, there is no loss in the SNR of the Golay code since the transducers within the selected aperture are all used. In other words, the present invention increases SNR in proportion to the Golay code length L while providing the same resolution as conventional techniques do.

Embodiment 2

Figure 8:
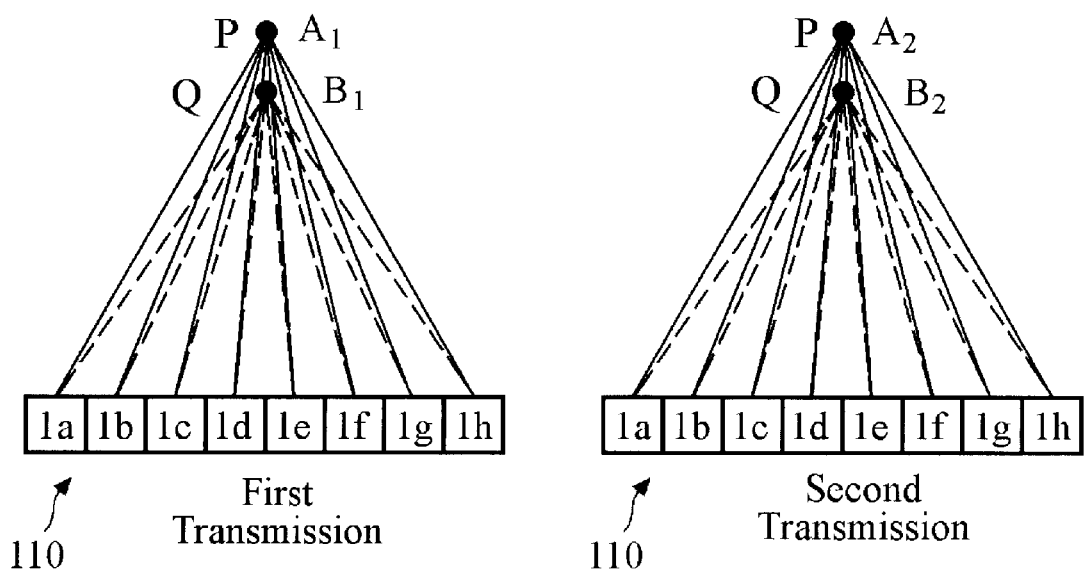
FIG. 8 is a drawing for explaining another ultrasound transmitting process in accordance with a second embodiment of the present invention.

Next, referring to FIG. 8, another ultrasound transmitting process in accordance with the present invention will be described. This second embodiment is different from the first embodiment in that transmit-focus points P and Q are on a same scan line. Thus, it does not need a plurality of receiving beamformers.

At the first instance of transmission, all transducers $1a$~$1h$ within a selected aperture of an transducer array 110 transmit to an object a signal $X(A_1+B_1)$, which represents the sum of two sequence codes $A_1$ and $B_1$ having different amounts of delay and being orthogonal to each other such that a first code sequence $A_1$ with transmit-focus delays is transmit-focused at the point P, which is a transmit-focusing position on the N-th scan line and, simultaneously, a first orthogonal code sequence $B_1$ with transmit-focus delays is transmit-focused at the point Q, which is a transmit-focusing position on the same N-th scan line.

At the second instance of transmission, the same transducers $1a$~$1h$ used at the first instance of transmission transmit to an object a signal $Y(A_2+B_2)$, which represents the sum of two sequence codes $A_2$ and $B_2$ having different amounts of delay and being orthogonal to each other such that a second code sequence $A_2$ with transmit-focus delay is transmit-focused at the point P which is a transmit-focusing position on the N-th scan line and, simultaneously, a second orthogonal code sequence $B_2$ with transmit-focus delay is transmit-focused at the point Q, which is a transmit-focusing position on the same N-th scan line.

Since data of two transmit-focal points are obtained by two transmissions, the frame rate is not decreased compared with the conventional pulsing techniques. Particularly, for a low-priced ultrasound imaging apparatus, the conventional receiving technique can be used with an addition of two more correlators by using the transmitting technique in accordance with the present invention. Compared with the conventional non-coding pulsing technique, the frame rate is not decreased if signals are compressed after being focused.

Although the frame rate of the second embodiment is decreased to 1/M compared with a conventional pulsing technique having one focal point, more accurate images with high SNR can be obtained by way of multi transmit-focus points.

The present invention as discussed so far, various codes are transmitted simultaneously by using the orthogonality of the Golay codes, therefore the same sound field characteristic can be obtained and the frame rate does not decrease. Accordingly, the SNR of the present invention is superior to that of the conventional method using the Golay code, and also the frame rate does not decrease compared to general pulsing techniques.

While the present invention has been described and illustrated with respect to preferred embodiments of the present invention, variations and modifications can be made within the spirit and the scope of the present invention. For example, the present invention exemplifies the case of M=2, however, it is also extendible to a case of M>2. More particularly, when M is 3, one Golay code and two orthogonal codes, which are orthogonal to the Golay code, are used and they are focused at three focal points.

Furthermore, although the present invention explains one dimensional (1D) arrays, it is also applicable to a two dimensional (2D) array, in which transducer arrays are disposed on a 2D plane or a curved surface; a 1.75D array which has similar configuration as the 2D array, while reducing the size of the transducer arrays in vertical direction, thereby decreasing total number of the transducers; and a 1.5D array that is manufactured simpler than the 1.75D array and transducers in vertically symmetric positions are electrically bound with each other.

What is claimed is:

1. An ultrasound imaging apparatus for forming an ultrasound image of an object, comprising:

storing means for storing M number of code sets having M number of complementary code sequences, in which the M number of code sets are orthogonal to each other;

transmitting means for sequentially transmitting M number of combined signals as ultrasound transmission signals to M number of predetermined focal points within the object, in which the M number of combined signals are obtained by combining the respective corresponding code sequences within the M number of code sets;

receiving means for receiving signals reflected from the corresponding focal points to which the ultrasound signals are sequentially transmitted; and processing means for extracting and processing data corresponding to the M number of code sequences within the stored M number of code sets from the reflected signals to thereby form the ultrasound image of the object.

2. The ultrasound imaging apparatus of claim 1, wherein the ultrasound transmission signals form transmission scan lines, and the M number of focal points exist at different transmission scan lines.

3. The ultrasound imaging apparatus of claim 1, wherein the ultrasound transmission signals form transmission scan lines, and the M number of focal points exist at the same transmission scan line.

4. The ultrasound imaging apparatus of claim 1, wherein the transmitting means includes a transducer array having a plurality of transducers, and the ultrasound transmission signals are transmitted by transducers within a predetermined aperture of the transducer array.

5. The ultrasound imaging apparatus of claim 4, wherein the ultrasound transmission signals are transmitted as being modified as center frequency of the transducers within the predetermined aperture of the transducer array.

6. The ultrasound imaging apparatus of claim 1, wherein the processing means includes:

M number of correlators which are interconnected in parallel, for receiving the reflected signals, and for extracting the data corresponding to the M number of code sequences from the reflected signals; and M number of adders, connected to output terminals of the M number of correlators, for sequentially adding the extracted data.

7. The ultrasound imaging apparatus of claim 6, wherein the processing means further includes M number of receiving beamformers connected to output terminals of the adders, in which the M number of receiving beamformers independently perform dynamic transmit-focusing by using the sequentially added data.

8. The ultrasound imaging apparatus of claim 6, wherein the processing means further includes a single receiving beamformer connected in common to output terminals of the M number of adders, in which the single receiving beamformer performs dynamic transmit-focusing by using the sequentially added data.

9. The ultrasound imaging apparatus of claim 1, wherein each of the M number of code sets has the length of L, and is comprised of the sets of biphase sequences, $A_1$, satisfying the following equation:

$$A_i = [a_{i1}, a_{i2}, \ldots, a_{iL}], i=1, 2, \ldots, M$$

wherein L is the length of the total biphase sequences, $a_{i1}$, $a_{i2}, \ldots, a_{iL}$ being the biphase sequences are selected among −1, 0, 1, and the set of biphase sequences is a set of complementary biphase sequences satisfying the following equation:

$$\sum_{i=1}^{M} \sum_{l=1}^{L-k} a_{il} a_{i,l+k}^* = ML\delta(k), \quad k = 0, 1, \ldots, L-1$$

wherein $\delta(k)$ represents a dirac function.

10. An ultrasound imaging method for an object comprising the steps of:
preparing M number of code sets having M number of complementary code sequences, in which the M number of code sets are orthogonal to each other;
sequentially transmitting M number of combined signals as ultrasound transmission signals to M number of predetermined focal points within the object, in which the M number of combined signals are obtained by combining the respective corresponding code sequences within the M number of code sets;
receiving signals reflected from the corresponding focal points to which the ultrasound signals are sequentially transmitted; and
extracting and processing data for the M number of code sequences within the stored M number of code sets from the reflected signals to form the ultrasound image of the object.

11. The ultrasound imaging method of claim 10, wherein the ultrasound transmission signals form transmission scan lines and the M number of focal points exist at different transmission scan lines.

12. The ultrasound imaging method of claim 10, wherein the ultrasound transmission signals form transmission scan lines and the M number of focal points exist at the same transmission scan lines.

13. The ultrasound imaging method of claim 10, wherein the ultrasound transmission signals are transmitted by transducers within a predetermined aperture of the transducer arrays having a plurality of transducers.

14. The ultrasound imaging method of claim 13, wherein the ultrasound transmission signals are transmitted as being modified as center frequency of transducers within the predetermined aperture of the transducer array.

15. The ultrasound imaging method of claim 10, wherein the processing step includes:
M number of extracting steps for extracting the data for the M number of code sequences from the reflected signals; and
M number of sequentially adding step for sequentially adding the data extracted at the extracting step.

16. The ultrasound imaging method of claim 15, wherein the processing step further includes M number of forming steps of receiving beam after the respective adding steps, in which the M number of forming steps independently perform dynamic transmit-focusing by using the data from the respective adding steps.

17. The ultrasound imaging method of claim 15, wherein the processing step further includes the step of forming a single receiving beam after the M number of adding steps, in which the step of forming the single receiving beam performs dynamic transmit-focusing by using all data from the M number of adding steps.

18. The ultrasound imaging method of claim 10, wherein each of the M number of code sets has the length of L, and is comprised of the sets of biphase sequences, $A_i$, satisfying the following equation:

$$A_i = [a_{i1}, a_{i2}, \ldots, a_{iL}], i=1, 2, \ldots, M$$

wherein L is the length of total biphase sequences, $a_{i1}$, $a_{i2}, \ldots, a_{iL}$ being the biphase sequences are selected among −1, 0, 1, and the set of biphase sequences is the set of complementary biphase sequences satisfying the following equation:

$$\sum_{i=1}^{M} \sum_{l=1}^{L-k} a_{il} a_{i,l+k}^* = ML\delta(k), \quad k = 0, 1, \ldots, L-1$$

wherein $\delta(k)$ represents a dirac function.

* * * * *